United States Patent [19]

Howeth

[11] Patent Number: 4,961,762
[45] Date of Patent: Oct. 9, 1990

[54] STRUCTURALLY REINFORCED, SELF-ALIGNING PANEL FILTER APPARATUS WITH ASSOCIATED CLAMPING, FACE SEALING AND BACKFLUSHING STRUCTURE

[76] Inventor: D. Franklin Howeth, 233 Chuck Wagon Trail, Fort Worth, Tex. 76108

[21] Appl. No.: 282,479

[22] Filed: Dec. 9, 1988

[51] Int. Cl.$^5$ .................................... B01D 46/04
[52] U.S. Cl. .................................... 55/302; 55/497; 55/502; 55/357
[58] Field of Search .............. 55/302, 357, 356, 497, 55/499, 502; 15/340.1, 352

[56] References Cited

U.S. PATENT DOCUMENTS

| | | | |
|---|---|---|---|
| 4,272,262 | 6/1981 | Britt et al. | 55/302 |
| 4,328,014 | 5/1982 | Burgoon et al. | 55/300 |
| 4,331,459 | 5/1982 | Copley | 55/302 |
| 4,345,353 | 8/1982 | Sommerfeld | 15/349 |
| 4,548,627 | 10/1985 | Landy | 55/502 |
| 4,637,825 | 1/1987 | Howeth | 55/497 |
| 4,661,131 | 4/1987 | Howeth | 55/302 |
| 4,708,723 | 11/1987 | Howeth | 55/321 |
| 4,740,221 | 4/1988 | Howeth | 55/302 |

Primary Examiner—Bernard Nozick
Attorney, Agent, or Firm—Hubbard, Thurman, Turner, Tucker & Harris

[57] ABSTRACT

A backflushed panel type filtration system is positionable over the flow discharge opening in a dividing wall separating the material collection and clean air flow chamber portion of an air throughflow type particulate collecting device. The filtration system has a filter media section captively retained within an inner peripheral face frame which, in turn, is nested within an outer support frame, this dual frame structure being provided with upstream and downstream peripheral face sealing gaskets. An upstream side flange portion of the outer frame is insertable into the discharge opening and serves to automatically align the filter structure therewith. An internally partitioned clean air flow shroud is removably positionable atop the filter structure and has flange portions which engage the downstream seal gasket and cooperate with side wall portions of the outer filter frame to automatically align the shroud with the underlying filter structure. Front and rear clamping structures are operable to clamp the shroud downwardly against the filter to compress the sealing gaskets and form upstream and downstream peripheral face seals around the filter structure. Cooperating wall portions on the outer filter frame and the shroud prevent clamping over-compression of the inner filter frame. A series of multi-jet type flushing heads are positioned behind the open rear end of the shroud and are operable, via quick-opening valves and a stepper motor, to periodically flow bursts of pressurized air through the shroud and across the filter media to dislodge particulate matter adhering to the upstream face thereof.

36 Claims, 4 Drawing Sheets

STRUCTURALLY REINFORCED, SELF-ALIGNING PANEL FILTER APPARATUS WITH ASSOCIATED CLAMPING, FACE SEALING AND BACKFLUSHING STRUCTURE

BACKGROUND OF THE INVENTION

The present invention relates generally to filtration apparatus and, in a preferred embodiment thereof, more particularly provides structurally reinforced, self-aligning panel filter apparatus with associated clamping, face sealing and backflushing structure, the filter apparatus being positionable to extend across a discharge opening formed in a wall separating the material collecting and clean air flow chamber portions of a particulate collecting system.

The mechanical forces generated by industrial and other processes are often imparted to associated micron size material to make them airborne, thereby creating, via the resulting dust, undesirable hygienic and environmental conditions. In the interest of controlling these conditions, several types of particulate collecting systems utilizing an air flow stream have been devised to scavenge dust and other airborne particulates into chambered receivers having a material collecting chamber with an air flow stream inlet and outlet. Such collecting systems commonly include means for filtering particles from the flow stream traversing the material collecting chamber prior to its discharge therefrom. In the typical particulate collecting system, the interior of the material collecting chamber is separated from a clean air flow discharge chamber by a dividing wall having a discharge opening therein in which the filter means are operatively disposed to collect particulate matter and prevent it from being discharged into the clean air flow chamber.

A variety of chambered material receivers are present in today's market. Examples of such apparatus are disclosed in U.S. Pat. Nos. 4,272,262; 4,331,459; and 4,661,131. The particulate collection apparatus disclosed in these patents utilize panel filters which bar particulates from being discharged from the collecting chamber outlets. The filters are periodically cleaned by backflushing systems which utilize sudden reverse flows of high energy gas directed by reverse flow passages which are a permanent part of the material receiver and/or the filter apparatus. In other words, in these conventional particulate collection structures, the reverse flow cleaning passages are constructed to be a permanent part of the particulate collection system housing and/or a permanent part of the filter structure itself.

Further, the filters of these conventional systems are arranged to clean the air flow stream as it is discharged from the material collecting chamber. Accordingly, the filters are mounted in arrangements facilitating particulate removal upstream from the collecting chamber outlet. Means mounted downstream from this outlet provide for reverse flow filter cleaning as previously described. To service the filters in these conventional systems, it is typically necessary to enter the "dirty" side of the apparatus—i.e., the interior of the material collection chamber. The backflushing systems for the filter element or elements are positioned in the aforementioned clean air discharge chamber downstream from the material collecting chamber, and servicing of the backflushing system typically entails entry into this downstream chamber. Thus, both chambers of the particulate collecting system must be entered for servicing its components.

U.S. Pat. No. 4,740,221 provides a self-cleaning filter system incorporating a filter mounted to a clean air flow conductor. After interconnecting the filter and its associated flow conductor, the resulting assembly is installed in the material collecting chamber via the clean air discharge chamber and is secured to the downstream side of the material collecting chamber flow stream outlet. The flow conductor, when operatively engaged with the discharge outlet, provides means for aligning and sealing the filter. In other words, the filter is dependent upon the flow conductor for structural integrity to permit the assembly to be inserted into the material collecting chamber through its air outlet. Thus, the filter and its associated flow conductor must be pre-assembled before installing them through the chamber outlet.

The previously referenced U.S. Pat. Nos. 4,331,459 and 4,661,131 disclose air filtering systems incorporating panel or planar air filter structures in unitized construction with clean air flow conductors. The unitized filter/flow conductor unit is installed by entry into the material collecting chamber (i.e., the "dirty" side of the material collection system) and through clamping engagement over the material collecting chamber air outlet. Since the flow tube is a unitary part of the filter structure, the flow tube must be thrown away when its associated filter portion needs to be replaced. The previously referenced U.S. Pat. No. 4,272,262 discloses panel filters mounted to a relatively large flow tube structure permanently incorporated in the material collecting chamber. The filter is installed through entry to this chamber. The large, permanently mounted flow conductor structure undesirably consumes a considerable portion of the material receiving chamber.

In other instances, as exemplified in U.S. Pat. Nos. 4,345,353 and 4,328,014, a panel filter is engaged to the downstream face surrounding the air/material receiver outlet. The filter is aligned to the outlet opening by virtue of the alignment of a filter clamping device to the opening and by alignment of the filter with its clamping device. In other words, the filter is mated to its clamping device and the clamping device is mated to the receiver downstream air outlet.

Conventional particulate collecting systems such as those disclosed in the previously referenced U.S. Pat. Nos. 4,258,451; 4,328,014; and 4,272,262 typically provide filter structures having relatively light weight filtration media. Commonly, to facilitate fabrication, the frames of these filter structures are also of relatively light weight material. The frame work must retain the filter media and seal integrity against the stress of air flow and filter cleaning backflushing. Typically, the filter structure forces resulting from air flow pressure loss across dirty filter medial can become quite high. For instance, a four square foot panel filter having a pressure drop of eight inches of water will be subjected to a lateral thrust of approximately 170 pounds. Field experience has presented many cases of seal leakage in panel filters. Obviously, structural integrity of both the filter frame and its clamping means are suspect in these cases.

The well-known problems, disadvantages and limitations associated with the filter structures and associated backflushing structures of the above-mentioned and other conventional particulate collection systems may be summarized as follows:

1. Filter reverse flow cleaning passages in many instances are integral and permanent parts of the system housing or the filter structure;

2. For most conventional systems, filter servicing requires entry into the system material receiving chambers (i.e., the "dirty" sides of the systems);

3. In at least one instance, to eliminate the need for entering the system's material receiving chamber for filter service, the filter must be attached to the flow conductor prior to assembly through the chamber outlet;

4. Unitized construction of the panel filter and its associated air flow conductor requires that both be discarded at the time of filter replacement;

5. Clean air flow conductors for certain panel filters are relatively large and extend into the material receiving chamber, thereby undesirably consuming considerable chamber space;

6. Panel filters sealed to downstream faces of chamber air discharge outlets are typically dependent upon their associated clamping structure to align them to the material receiving chamber outlet; and 7. Panel type filters are typically constructed using light structural framework that essentially precludes the rigid clamping of the filter structure necessary to overcome high thrust loads caused by air pressure drop across the filter.

In view of the foregoing, it is an object of the present invention to provide improved panel filter and associated backflushing apparatus which eliminates or minimizes the above-mentioned and other problems, disadvantages and limitations typically associated with the filter and backflushing structures in conventional particulate collection systems.

SUMMARY OF THE INVENTION

In carrying out principles of the present invention, in accordance with a preferred embodiment thereof, an improved, backflushed panel type filtration system is provided which is positionable over a discharge opening formed through a dividing wall that separates a material collection chamber from a clean air flow chamber in a particulate collecting system of the type in which a particulate-entraining gas stream is flowed outwardly from the material collection chamber through the dividing wall discharge opening. While the filtration system of the present invention is applicable to filter a particulate-laden gas stream flowing outwardly through the material collection chamber discharge opening in various types of particulate collecting systems, a preferred embodiment thereof is representatively incorporated in the hopper clean air flow chamber of a rotary broom type street sweeper.

The filtration system includes a subframe support structure connectable to the clean air flow chamber side of the dividing wall, the subframe structure generally bordering the rectangular dividing wall discharge opening and providing a convenient mounting base for the balance of the filtration system. A downturned flange portion of the subframe structure, bordering its opening, is configured to be closely received within the dividing wall discharge opening to thereby automatically align the subframe opening (and thus the balance of the subframe structure) with the dividing wall discharge opening.

To filter the particulate entraining gas stream flowing through the subframe opening into the clean air flow chamber, a uniquely configured panel type filter structure is provided. The filter structure, in a preferred embodiment thereof, includes a rectangular pleated filter media section sandwiched on opposite sides by correspondingly sized rectangular expanded metal covering elements having relatively large open areas. The filter media section and its associated side covering elements are supported within a specially designed dual frame structure including a rectangular inner face frame of a relatively light weight metal construction, and a substantially stronger rectangular metal outer support frame.

The inner face frame has a generally U-shaped cross-section, defined by peripheral side walls and inwardly projecting top and bottom peripheral walls, and receives and captively retains peripheral edge portions of the filter media section and its expanded metal covering elements. The edges and opposite ends of the pleated filter media section are secured to the interior surface of the inner face frame with suitable end clips and bonding epoxy material.

The outer support frame has a pair of opposite front and rear end walls, and a pair of opposite side walls which are made vertically wider than the front and end walls in a manner such that upper side edge portions of the side walls project upwardly beyond the upper side edges of the front and rear end walls. Extending inwardly from the bottom side edges of the front, rear and side walls of the outer support frame is a peripheral bottom lip bordered at its inner side edge by a downturned peripheral alignment flange.

The inner face frame is downwardly received within the outer support frame in a manner such that the bottom peripheral wall of the inner frame rests upon the peripheral bottom lip portion of the outer frame, and the upper peripheral wall of the inner frame is positioned somewhat below the upper side edges of the front and rear end walls of the outer frame. The facing side wall surfaces of the inner and outer frames are bonded together with a suitable epoxy material.

The double framed filter structure is provided with a rectangular lower or upstream resilient sealing gasket, and a rectangular upper or downstream resilient sealing gasket. The lower sealing gasket has a lower side portion which has a generally U-shaped cross-section and receives and retains the downturned peripheral alignment flange of the outer frame. This lower side portion of the lower sealing gasket is sized to be closely received in the subframe opening. Projecting laterally outwardly from this lower side portion of the upstream sealing gasket is a rectangular face seal portion of the gasket which underlies the peripheral bottom lip of the outer frame.

The upper sealing gasket rests upon and extends around the top peripheral wall of the inner frame. In its uncompressed state the upper sealing gasket has an upper side surface positioned somewhat higher than the upper side edges of the front and rear end walls of the outer frame.

To properly position the filter structure over the dividing wall discharge opening, all that is necessary is to insert the gasket-covered alignment flange into the subframe opening. This automatically aligns the filter structure with the subframe opening, thus aligning it with the dividing wall discharge opening as well. The gasket-covered alignment flange, a portion of the dual frame structure, thus defines means for aligning the overall filter structure with the discharge opening. It will be appreciated that if the subframe structure was not utilized, the gasket-covered alignment flange could be sized to snugly fit within the discharge opening itself to perform the same filter structure alignment function.

The filtration system of the present invention also includes a metal clean air flow shroud member adapted to be removably positioned atop the filter structure and automatically aligned therewith. The shroud member has a forwardly and downwardly sloping top wall, a pair of side walls depending from opposite side edges of the top wall, an open rear end, a closed front end, and a bottom side opening positionable over the free filter area of the filter structure. Partition members within the shroud divide its interior into a plurality of flow passages extending from the open bottom side of the shroud rearwardly to its open back end, and bottom rear side edge portions of the shroud side walls are intersecured by a bottom connecting wall of the shroud.

Alignment and clamping wall means are formed around the bottom periphery of the shroud member and, when the shroud member is placed atop the installed filter structure, rest upon and extend around the upper side surface of the upper seal gasket. Opposite side portions of the alignment and clamping wall means are closely received between and cooperate with the vertically projecting upper side edge portions of the outer frame side walls to automatically align the shroud laterally relative to the underlying filter structure. Front-to-rear alignment of the shroud relative to the filter structure is automatically provided by a downturned rear flange portion of the aligment and clamping wall means which is captively retained between the rear end wall of the outer filter frame and a pair of upwardly extending support post members, secured to the subframe structure, which receive therebetween a rear end portion of the shroud.

Clamping means are provided to clamp the automatically aligned shroud member downwardly onto the underlying filter structure to operatively compress the upper and lower sealing gaskets and thereby form tight seals around the upper and lower peripheries of the filter structure. The clamping means are secured to the subframe structure and are preferably operable to clamp opposite front corner portions of the shroud member, and a central rear portion thereof, downwardly onto the upper seal gasket member. When the clamping means are appropriately tightened at these three points, the alignment and clamping wall means of the shroud are driven downwardly relative to the underlying filter structure in a manner such that the following sequence of events occurs.

During an initial tightening of the clamping means the portion of the alignment and clamping wall means which faces and contacts the upper seal gasket is driven downwardly to vertically compress both the upper seal gasket and the horizontally outwardly projecting portion of the lower seal gasket. Upon further tightening of the clamping means, front and rear end portions of the alignment and clamping wall means are brought into abutment with the upper side edges of the front and rear end walls of the outer filter frame, thereby precluding further downward movement of the shroud relative to the filter structure and also precluding further compression of the upper seal gasket.

Importantly, this feature of the present invention advantageously limits the total amount of compressive clamping stress which can be imposed upon the relatively light weight inner filter frame, yet provides an effective peripheral face seal around the upper side of the filter structure. The subsequent final tightening of the clamping means further compresses the outwardly projecting peripheral portion of the lower seal gasket without, as previously mentioned, further compressing the upper seal gasket or further stressing the inner filter frame.

In a preferred embodiment thereof, the clamping means include a pair of front clamping structures positioned adjacent front corner portions of the filter structure and shroud, and a rear clamping structure positioned behind the open rear end of the shroud member. Each of the front clamping structures comprises a vertically disposed clamping bolt threadingly carried by an upstanding support member and having a lower end which may be brought to bear upon a front end portion of the shroud's alignment and clamping wall means.

The rear clamping structure comprises a generally U-shaped clamping bracket which depends from the shroud's rear connecting wall and is laterally off-centered relative to the open rear end of the shroud, the clamping bracket having a bottom wall and first and second side walls projecting upwardly therefrom. Secured to the subframe structure rearwardly of the clamping bracket is a mounting bracket having a base wall and an upturned rear end wall. A vertical, externally threaded rod is secured at its lower end to the base wall of the mounting bracket and extends upwardly through an opening in an elongated, horizontally oriented latch bar. An upper end portion of the rod is threadedly received in a lower end portion of an internally threaded rear clamping bolt. A washer member circumscribes the rod and is captively retained between the lower end of the bolt and the upper side surface of the latch rod.

A cylindrical compression spring element coaxially circumscribes a lower end portion of the threaded rod and bears at its opposite ends against the connecting bracket base portion and the underside of the latch bar. The action of the spring element frictionally associates the latch bar with the rear clamping bolt in a manner such that the latch bar is pivoted about a vertical axis in response to rotation of the bolt.

After the shroud is operatively placed atop the filter structure the rear clamping structure (in conjunction with the previously described front clamping structures) is operated by turning the rear clamping bolt in a tightening direction to thereby swing a front end portion of the latch bar part one of the clamping bracket side walls and into the interior of the clamping bracket until it engages the other clamping bracket side wall. At this point the front end portion of the latch bar is positioned above the clamping bracket base wall, and a rear end portion of the bar is positioned above the upturned end portion of the connecting bracket.

Due to the engagement between the front end of the latch bar and a side wall of the clamping bracket, further tightening rotation of the rear clamping bolt does not further pivot the latch bar, but simply downwardly into engagement with the base wall of the clamping bracket, and the upturned end of the connecting bracket, to progressively lower the rear end of the shroud to effect the previously described compression of the filter sealing gaskets.

When it becomes necessary to unclamp the rear end of the shroud the rear clamping bolt is simply turned in a loosening direction to raise the latch bar and then swing its front end outwardly from the interior of the clamping bracket to free the shroud from the rear clamping structure.

To periodically backflush the filter media section, and dislodge particulate matter from its upstream side, a generally conventional backflushing system is mounted on the subframe structure rearwardly of the shroud. The backflushing system comprises a series of horizontally disposed valve operated multi-jet flushing heads, each of which is aligned with and forwardly faces one of the interior shroud flow passages. In a conventional manner the flushing heads are connected to a source of pressurized gas, and the head valves may be sequentially operated by a stepper motor to periodically discharge gas bursts forwardly through the shroud passages, in a desired sequence, to backflush the filter media section.

DETAILED DESCRIPTION

Figure 1:
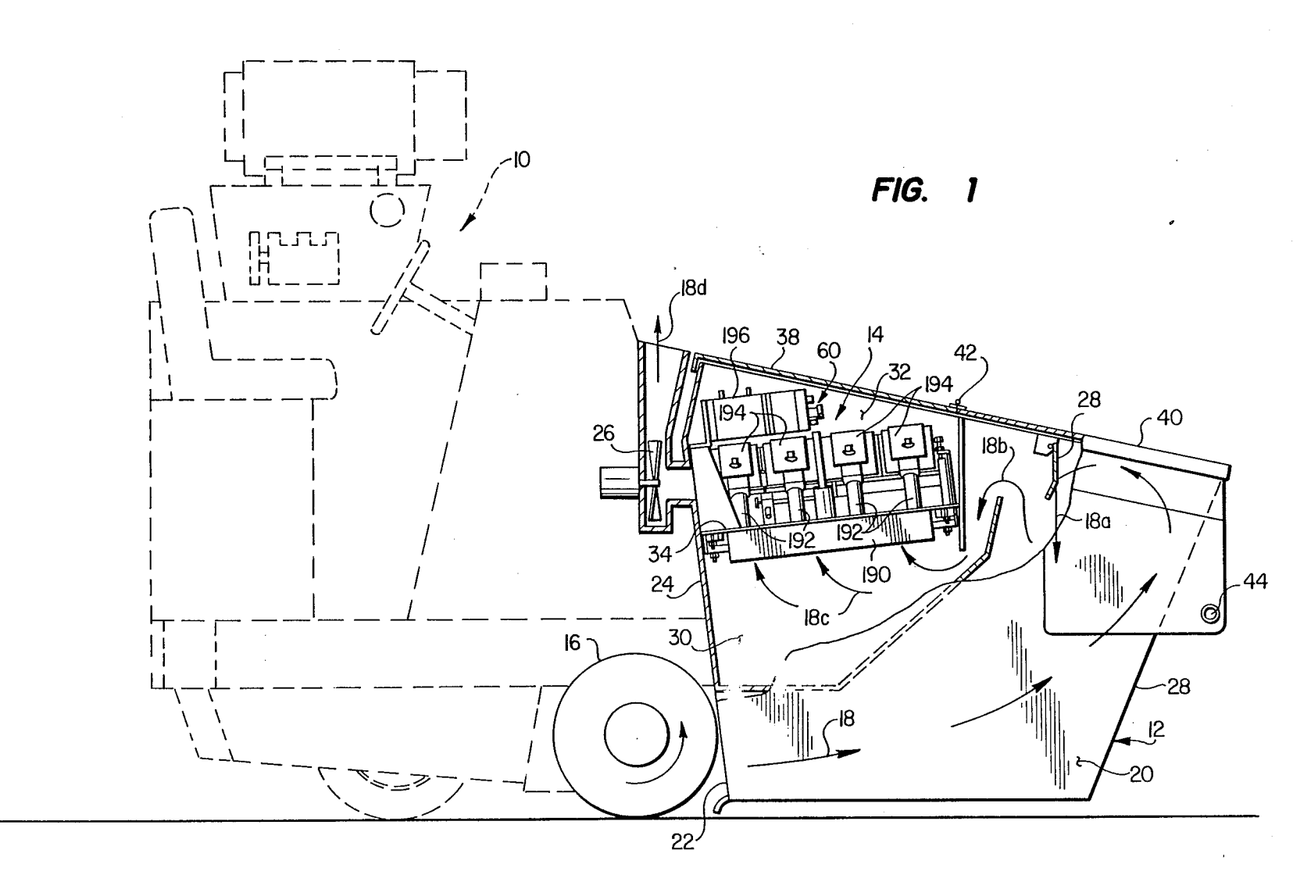
FIG. 1 is a partially cut away and phantomed side elevational view of a representative rotary broom street sweeper having a dust and debris collecting hopper section into which backflushed filtration apparatus of the present invention is incorporated.
Figure 3:
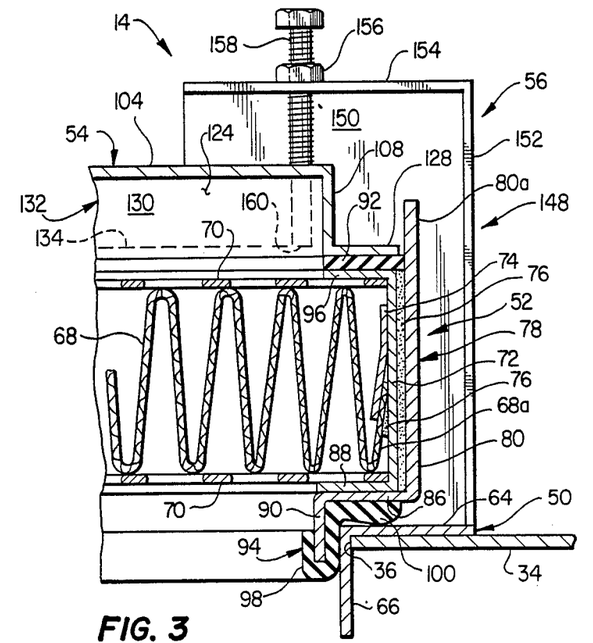
FIG. 3 is an enlarged scale partial cross-sectional view through the filtration apparatus taken along line 3—3 of FIG. 2.
Figure 4:
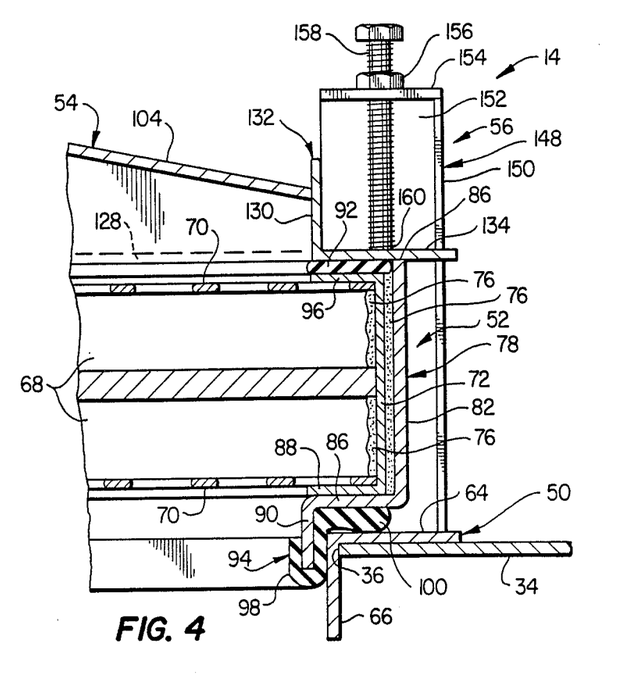
FIG. 4 is an enlarged scale partial cross-sectional view through the filtration apparatus taken along line 4—4 of FIG. 2.

Illustrated in FIG. 1 is a rotary broom type street sweeper 10 having a dust and debris collecting hopper section 12 into which a unique backflushed filter system 14 of the present invention is representatively incorporated. During operation of the representative sweeper 10, as more fully described in my U.S. Pat. No. 4,708,723, a rotary broom portion 16 of the sweeper sweeps dust and debris 18 into a debris chamber portion 20 of the hopper through an inlet opening 22 disposed in a lower portion of the rear hopper wall 24. During operation of the sweeper 10, an exhaust blower 26 draws the incoming dust and debris 18, as indicated by the various flow arrows within the hopper 12, forwardly and upwardly along the interior of the front hopper wall 28 and then causes the resulting particulate-laden flow stream to rearwardly strike a deflection plate member 28, thereby causing debris and heavier particulate matter $18_a$ to fall to the bottom of and be trapped in the debris chamber 20. The balance $18_b$ of the particulate laden flow stream is then drawn by the blower 26 through a relatively tortuous path into the interior of a material receiving chamber 30 which traps and retains a major portion of the finer particulate matter flowing leftwardly past the deflection plate 28. Collection chamber 30 is positioned below a clean air flow chamber 32 disposed in the upper rear corner of the hopper 12 and separated from the material collection chamber 30 by a dividing wall 34 which, as best illustrated in FIGS. 3 and 4, has a relatively large rectangular opening 36 formed therethrough.

The backflushed filtration system 14 of the present invention is operatively disposed within the clean air flow chamber 32 and, in a manner subsequently described, has a framed filter portion which extends across the dividing wall opening 36 to finally filter the partially cleansed air flow $18_c$ drawn from within the material collection chamber 30 into the clean air flow chamber 32 and discharged from the hopper structure by the blower 26 in the form of essentially clean air $18_d$.

The open top of the hopper 12 is covered by a top wall structure having a rear access portion 38 and a front hopper cover portion 40. Top wall portion 38 is hinged to the hopper 12 at point 42 and extends across the open top of the clean air flow chamber 32 so that it can be pivoted in a clockwise direction to provide complete top access to the chamber 32. Suitable latching means (not illustrated) are utilized to hold the wall portion 38 in place over the top of the chamber 32. The top wall portion 40 is similarly hinged at point 42 and, as illustrated and described in more detail in my U.S. Pat. No. 4,708,723, swings open to dump the trapped dust and debris within the hopper chambers 20 and 30 when the hopper is pivoted in a clockwise direction about its forwardly disposed pivot point 44 in a conventional manner.

Turning now to FIGS. 2-5, the backflushed filtration system 14 of the present invention generally comprises five primary components—subframe support structure 50, a reinforcingly framed panel type filter structure 52, an internally partitioned clean air flow shroud 54, front and rear clamping structures 56 and 58, and a filter backflushing system 60—which are positioned over the rectangular opening 36 in the hopper dividing wall 34 in a unique manner which will be subsequently described.

The subframe structure 50 includes an elongated rectangular rear mounting plate 62 which is suitably secured to the upper surface of the dividing wall 34 and extends across a rear end portion of the dividing wall opening 36. Positioned forwardly of the plate member 62 is an elongated rectangular open frame plate member 64 which is also suitably secured to the upper side surface of the dividing wall 34 and, as best illustrated in FIGS. 3 and 4, borders the periphery of the balance of the dividing wall opening 36. The frame members 62, 64 are provided with downturned flange portions 66 received in the dividing wall opening 36 and serving to align the subframe support structure 50 with such opening.

Figure 5:
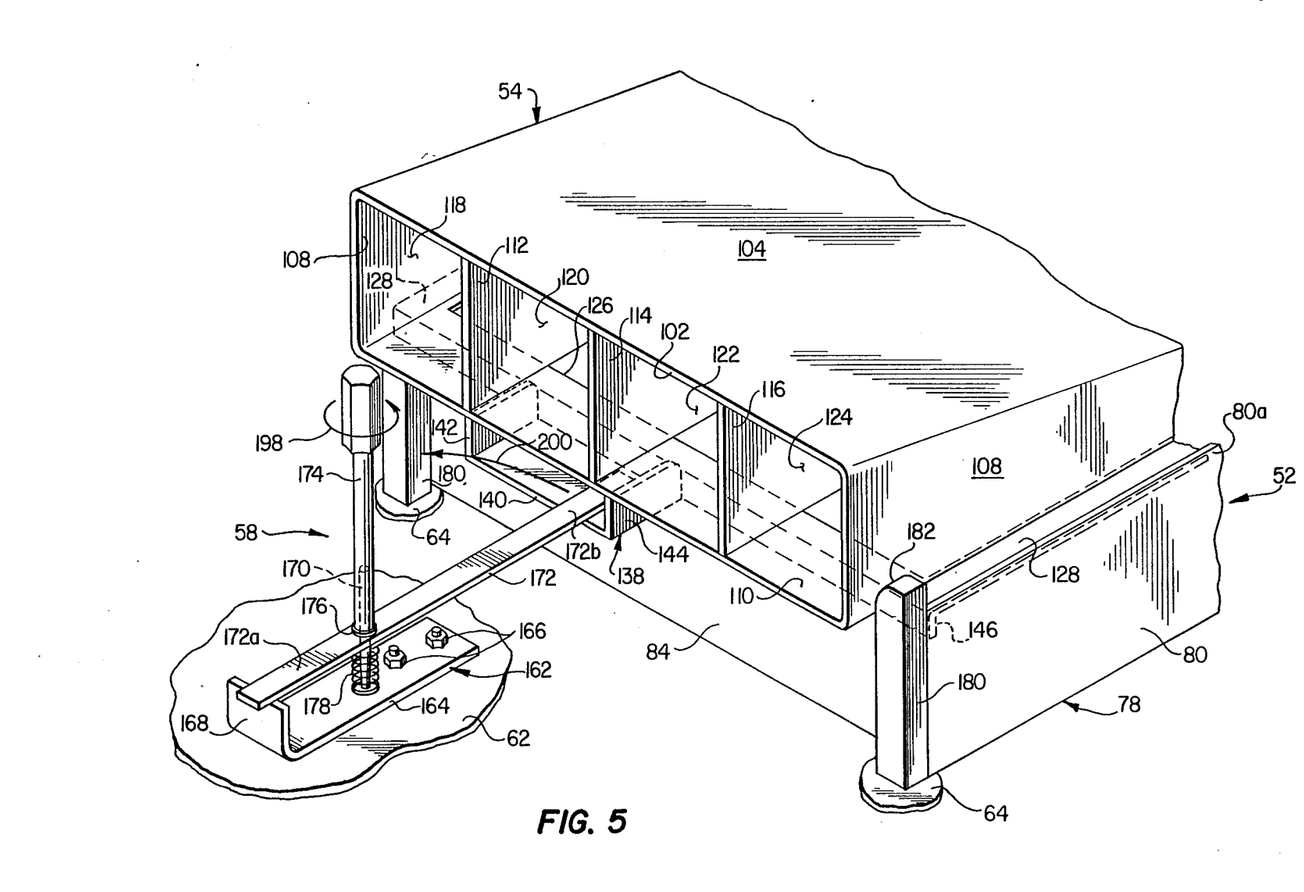
FIG. 5 is an enlarged scale rear perspective view of a left end portion of the framed filter and clean air shroud parts of the apparatus, together with a portion of an associated filter clamping system.

As best illustrated in FIGS. 3-5, the filter structure 52 includes an elongated rectangular section of pleated barrier type filter media 68 having positioned on its opposite sides expanded metal covering elements 70 with relatively large open areas. Extending outwardly around and receiving a peripheral edge portion of the pleated filter media section 68 and the expanded metal covering elements 70 is a relatively thin and light weight metal face frame 72. The opposite ends $68_a$ of the pleated filter media section 68 (FIG. 3) are positioned under suitable retaining clips 74 secured to the inner side surface of the inner frame 72, and are secured in this position by a suitable epoxy material 76. The opposite side edges of the filter pleats (FIG. 4) are secured to opposite interior side surface portions of the inner frame 72 by a similar epoxy material.

The inner face frame 72 is downwardly received within a substantially thicker and stronger metal outer reinforcing and support frame 78 having horizontally elongated rectangular opposite left and right side walls 80, and vertically shorter opposed front and rear end walls 82 and 84. Because the outer frame side walls 80 are vertically wider than the front and rear end walls 82 and 84, upper side edge portions 80$_a$ of side walls 80 project upwardly beyond the upper edges 86 of the front and rear end walls 82 and 84 for alignment purposes later described. The outer side surface of the inner frame 72 is bonded to the inner side surface of the outer frame 78 with epoxy 76.

Extending inwardly from the lower side edges of the outer frame walls 80, 82 and 84 is an inturned lip 86 (FIGS. 3 and 4) which underlies the lower peripheral side portion 88 of the inner frame 72. Projecting downwardly from the inner edge of the frame lip 86 is a peripheral flange 90.

For sealing purposes later described, upper and lower peripheral filter sealing gaskets 92 and 94 are provided, each of these gaskets being formed from a suitable resilient material such as rubber, neoprene or the like. The upper sealing gasket 92 has a flat rectangular configuration and, as illustrated in FIGS. 3 and 4, is positioned atop and extends around the upper side 96 of the inner face frame 72. The lower filter sealing gasket 94 has a lower side portion 98 which is configured to be snugly received within the inner side periphery of the downturned flange portions 66 of the subframe support structure 50. The lower gasket side portion 98 has a generally U-shaped cross-section, receives and retains the downturned outer frame flange 90, and has an outwardly projecting peripheral portion 100 which underlies the inturned lip 86 of the outer frame 78.

Referring now to FIGS. 2–5, the clean air flow shroud 54 is of metal construction and has an open left or rear end 102, a forwardly and downwardly sloping top side wall 104, to which a pair of lifting handles 106 are secured, and a pair of generally trapezoidally configured side walls 108 extending downwardly from the opposite side edges of the top wall 104. The bottom side of the shroud 54 is open except for a relatively narrow lower joining wall portion 110 which extends between and intersecures bottom rear end edge portions of the side walls 108. Projecting downwardly from the top side wall 104 across the interior of the shroud 54 are three partition walls 112, 114 and 116 (FIG. 5) which divide the interior of the shroud 4, from left to right as viewed in FIG. 5, into four generally equal area, longitudinally extending flow passages 118, 120, 122 and 124 that intercommunicate the bottom side opening 126 of the shroud 54 with its open rear end 102.

Beginning at a point slightly forward of the open rear shroud end 102, the lower side edges of the shroud side walls 108 have formed thereon horizontally outwardly projecting alignment flanges 128 which extend generally to the front end of the shroud side walls 108. A vertically disposed leg portion 130 of an elongated metal angle bracket 132 is welded to and closes the front end of the shroud 54, the bracket 132 having a forwardly projecting leg portion 134 which is generally in the same plane as the alignment flanges 128. For purposes later described, outer end portions of the bracket leg 134 are rectangularly notched as at 136. Also for purposes later described, a generally U-shaped latch bracket member 138 (FIG. 5) is secured to the underside of the joining wall 110, the bracket 138 being horizontally elongated in a left-to-right direction as viewed in FIG. 5, being offset to the left along the joining wall 110, and having a base wall 140 and left and right vertical side wall portions 142 and 144. As also illustrated in FIG. 5, a downwardly projecting stop flange 146, positioned adjacent the rear ends of the alignment flanges 128, is secured to the underside of the joining wall 110 directly behind the latch bracket member 138.

Figure 2:
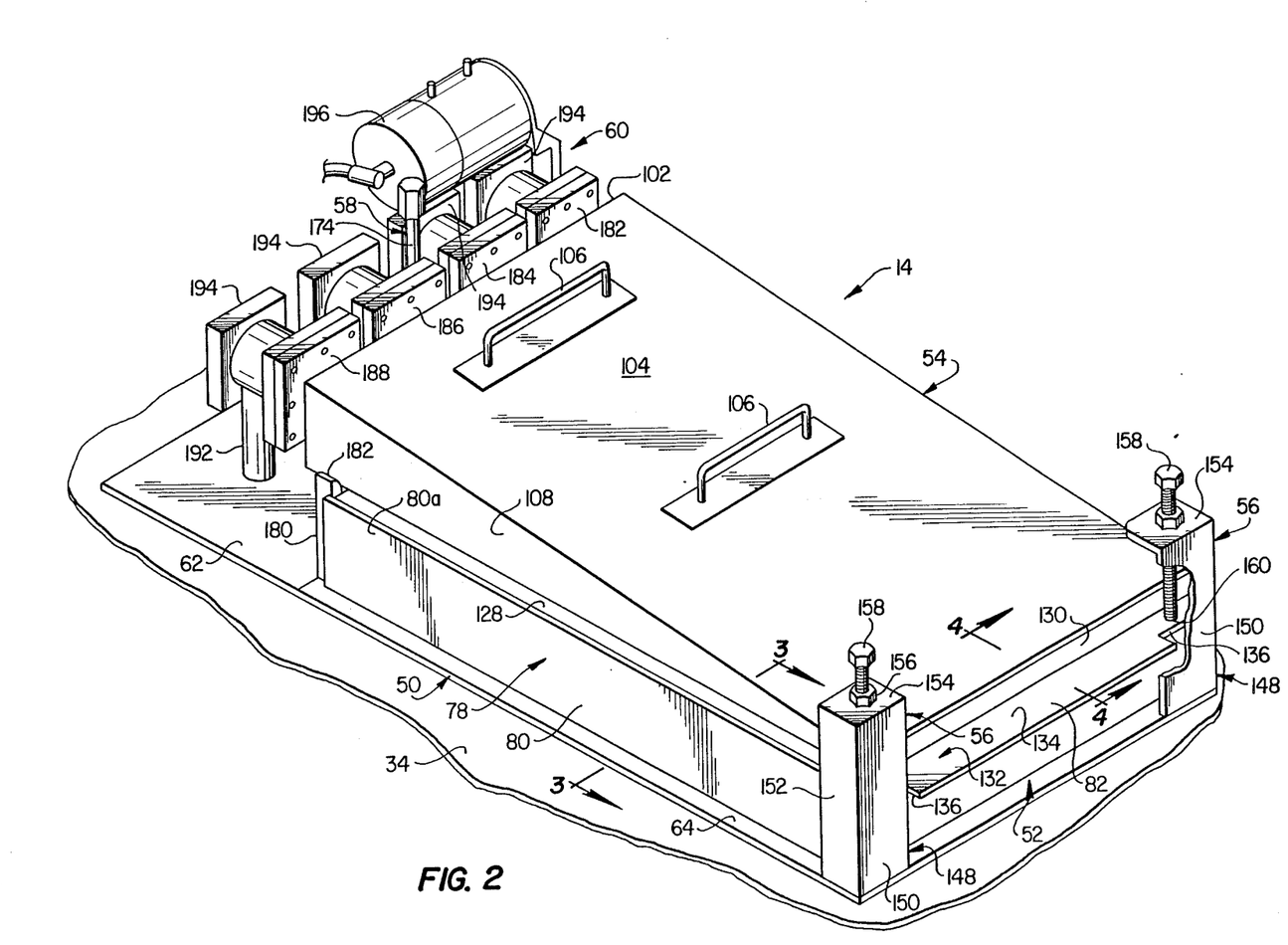
FIG. 2 is an enlarged scale front perspective view of the filtration apparatus.

Each of the front clamping structures 56, as best illustrated in FIGS. 2–4, includes a vertically disposed metal angle bracket 148 welded at its lower end to one of the front corners of the open frame plate member 64. Each of the brackets 148 has a front leg 150 and an outer side leg 152. The upper end of each of the brackets 148 has welded thereto a metal cap member 154 to a central portion of which a nut 156 is welded. Each of the nuts 156 threadingly receive an elongated clamping bolt 158 having a lower end 160.

Referring now to FIG. 5, the rear clamping structure 58 includes a mounting bracket 162 having a base portion 164 anchored to the rear mounting plate 62 by bolts 166, and an upturned rear end portion 168. Secured to a central portion of the base 164 of bracket 162 is a vertically projecting, externally threaded cylindrical rod 170 which extends (nonthreadingly) upwardly through a suitable opening formed in an elongated rectangular metal latch bar 172 having a rear end portion 172$_a$ and a front end portion 172$_b$.

An upper end portion of the rod 170, above the latch bar 172, is threadingly received in a lower end portion of an internally threaded clamping bolt member 174 whose lower end engages a suitable washer 176 positioned on the upper side surface of the latch bar 172. A compression spring element 178 circumscribes a lower end portion of the externally threaded rod 170, below the latch bar 172, and bears at its opposite ends against the mounting bracket portion 164 and the underside of the latch bar 172. Operating in conjunction with the clamping structure just described, in a manner subsequently discussed, are a pair of vertically extending rectangular metal post members 180 welded at their lower ends to the rear corner portions of the open frame plate member 64. As can best be seen in FIGS. 2 and 5, the upper ends of the post members 180 are radiused as at 182.

Referring now to FIGS. 1 and 2, the filter backflushing system 60 is of a generally conventional construction and operation, is operatively mounted on the rear mounting plate 62, and includes four multi-jet flushing heads 182, 184, 186 and 188 which are positioned rearwardly of the open rear end 102 of the air flow shroud 54, and are respectively aligned with the internal shroud air flow passages 118, 120, 122 and 124. The four flushing heads are operatively communicated with the interior of a pressurized fluid manifold 190 (FIG. 1), supported beneath the hopper dividing wall 34, by means of flow conduits 192 in each of which is operably interposed a quick-opening gas exhaust valve 194. In a conventional manner, a pilot valve stepper motor 196 is utilized to sequentially open the exhaust valves 194, in a predetermined order, to sequentially cause the flushing heads to discharge a high pressure burst of air from the manifold 190 into the head's associated flow passage within the shroud 54 to backflush a portion of the previously described filter element. As can best be seen in FIG. 2, the clamping bolt 174 is positioned generally centrally between the valves 194.

The filtration system 14 is easily and rapidly mounted on the dividing wall 34 in a manner and sequence which will now be described. First, the subframe support structure and the filter backflushing system 60 are mounted on the dividing wall as illustrated. Next, the filter structure 52 is installed by inserting the outer frame flange 90, and the lower gasket portion 98 which receives it (see FIGS. 3 and 4) into the subframe opening defined by the downwardly projecting flange 66. This quickly and automatically aligns the filter structure 52 with the subframe support structure 50 (and thus with the dividing wall opening 36) and positions the lower sealing gasket 100 in a position to be compressed to form an upstream filter face seal in a manner subsequently described. With the filter structure 52 rapidly installed and automatically aligned in this manner, the rear end wall 84 of the outer frame 78 is positioned closely adjacent the front side surfaces of the rear post members 180. Additionally, the front end wall 82 of the outer filter frame 78 is positioned closely adjacent the rear side surfaces of the front legs 150 of the front clamping structure angle brackets 148.

Next, the shroud 54 is operatively installed atop the filter structure 52 by forwardly tipping and moving the shroud until opposite end portions of the front bracket leg 144 are positioned beneath the lower ends 160 of the front clamping bolts 158, and a central portion of the bracket leg 134 is positioned between facing side edges of the front bracket legs 150 as facilitated by the bracket end notches 136. The shroud 54 is then rearwardly tipped to its generally horizontal operating position to thereby position the shroud side flanges 128 between the upper portions 80a of the outer frame side walls 80. In this lowered position of the shroud 54, the rear stop flange 146 (FIG. 5) is positioned forwardly adjacent the rear vertical post members 180, and rearwardly adjacent the rear end wall 84 of the outer filter frame 78. In this manner, the downturned stop flange 146 serves to align the shroud member 54 in a front-to-rear direction relative to the filter structure 52, and the alignment flanges 128 cooperate with the upper side portions 80a of the side walls 80 of the outer filter frame 78 to automatically align the shroud 54 with the underlying filter structure 52 in a side-to-side manner. Lowering of the rear end portion of the shroud 54 to its position closely between the vertical post 180 is facilitated by the radiused portions 182 of the vertical posts.

With the shroud 54 positioned atop, and automatically aligned with, the underlying filter structure 52, the front bracket leg 134, the alignment flanges 128, and a rear portion of the joining wall 110 rest upon and extend around the upper sealing gasket 92. With the sealing gasket 92 in an essentially uncompressed state, its upper side surface, and thus the peripheral portions of the shroud which engage it, are positioned slightly above the upper side edges of the vertically shorter outer frame front and rear end walls 82 and 84.

The final step in the mounting and assembly of the filtration system 14 comprises the downward clamping of the shroud 54 to the filter structure 52 utilizing the previously described front and rear clamping structures 56 and 58. Specifically, to clamp a front end portion of the shroud 54 to the filter structure 52, the front clamping bolts 158 are simply tightened against the front bracket leg 134 to move a front end portion of the shroud 54 downwardly relative to a front end portion of the underlying filter structure 52.

Prior to the previously described lowering of a rear end portion of the shroud 54 onto a corresponding rear end portion of the underlying filter structure 52, the rear clamping bolt 174 is rotated in a counterclockwise direction as indicated by the arrow 198 in FIG. 5 to cause a corresponding counterclockwise pivoting of the latch bar 172 to prevent it from interfering with the lowering of the rear end of the shroud 54. The action of the spring element 178, which presses the latch bar 172 upwardly against the retained washer element 176, creates a sufficient frictional force upon the latch bar 172 so that it easily turns with the clamping bolt 174.

After the shroud is positioned atop the filter structure 52, the bolt 174 is turned in a clockwise direction to correspondingly pivot the latch bar 172 in a clockwise direction, thereby swinging the bar end 172b into the interior of the latch bracket 138 and against its right side walls 144, and positioning the rear end portion 172a of the latch bar over the upper end of the rear end portion 168 of the mounting bracket 162. The clamping bolt 174 is then turned further in a clockwise direction to force the latch bar 172 downwardly onto the upper end of bracket end portion 168 and the base wall 140 of the latch bracket 138. Such further clockwise rotation of the bolt 174 does not cause further clockwise rotation of the latch bar 172 due to the interengagement between its front end portion 172b and the latch bracket side wall 144. The lowering of the latch bar 172, of course, correspondingly moves the rear end portion of the shroud 54 downwardly.

Appropriate tightening of the front clamping bolts 158 and the rear clamping bolt 174 initially compresses the upper sealing gasket 92 and the peripheral portion 100 of the lower sealing gasket 94. Further tightening of the three clamping bolts brings the joining wall 110 (FIG. 5) and the front bracket leg portion 134 (FIG. 4) into contact with the upper side edges of the front and rear outer filter frame walls 82 and 84 (see, e.g., the engagement between the front bracket leg portion 134 and the upper side edge 86 of the front outer frame wall 82 in FIG. 4).

Still further tightening of the front and rear clamping bolts further compresses the portion 100 of the lower sealing gasket 94 but, quite importantly, does not further compress the upper sealing gasket 92, the upper edge portions of the front and rear outer frame walls 82 and 84 acting as stops to prevent further compression of the upper sealing gasket. In turn, this limits the overall vertical compression stress which may be imposed upon the relatively light weight inner filter frame 72. Thus, despite the ability, by tightly clamping the shroud 54 against the filter structure 52, to form excellent upstream and downstream seals around the filter structure periphery, excessive, and potentially damaging compressive stresses on the filter media section 68 and its inner frame structure 72 is avoided. On the other hand, however, the unique double filter frame structure just described securely and accurately mounts the filter media and substantially reinforces it against damage or dislodgment caused by often quite high air pressure drops across the filter.

It can be seen from the foregoing that the flange portion 90 and the lower sealing gasket portion 98 (which collectively define a portion of the overall filter framing structure) define means for automatically aligning the filter structure 52 with the opening 36 through the dividing wall 34, and the upwardly projecting portions 80a of the outer frame walls 80 serve to automatically laterally align the shroud relative to the already aligned filter structure 52. This lateral alignment is aided by the previously described operation of the vertical rear posts 180. Further, the downturned stop flange 146 (FIG. 5) serves to automatically align the shroud 54 in a front-to-rear direction relative to the underlying filter structure 52. The three point clamping mechanism previously described functions to very evenly compress the upper and lower sealing gaskets 92 and 94, and the engagement between the front bracket leg 134, and the joining wall 110, with the upper side edges of the vertically shorter front and rear end walls 82, 84 of the outer frame 78 serve to protect from excessive clamping stress the relatively thin inner filter frame 72.

During normal filtering operation within the hopper 12 (FIG. 1) the partially cleansed air flow 18c is drawn upwardly across the filter media section 68 (FIG. 3), enters the interior of the shroud 54 via its bottom side opening 126, flows left-wardly through the interior partitioned shroud passages 118, 120, 122 and 124, is drawn outwardly through the open left end 102 of the shroud 54 and is then discharged to atmosphere, in the form of clean air stream $18_d$ (FIG. 1) by operation of the blower 26. During backflushing of the filter media section 68, the exhaust valves 194 (FIG. 2) are opened in a predetermined sequence by the stepper motor 196 to backflush the filter media section 68 as previously described.

To rapidly replace the filter portion of the filtration system 14, without any necessity of entering the "dirty" side of the hopper 12, the access wall portion 38 (FIG. 1) is swung upwardly to uncover the top of the clean air flow chamber 32. The front and rear clamping bolts 158 and 174 are then loosened to an extent sufficient to permit the shroud 54 to be lifted off the underlying filter section 52. Loosening of the rear clamping bolt 174 (due to the previously described frictional forces imposed upon the latch bar 172 by the spring 178) automatically pivots the latch bar 172 in a counterclockwise direction to remove the front end portion $172_b$ of the bar from within the latch bracket 138, thereby permitting the shroud 54 to be removed. Once the shroud is removed in this manner, the filter structure 52 is removed and replaced. The shroud 54 is then quickly reinstalled as previously described, and the access cover 38 is pivoted to its closed position and relatched to ready the filtration system 14 for continued operation.

The filtration system 14 of the present invention is quite easy to install and disassemble, may be formed from relatively simple and easy to fabricate components, and eliminates or minimizes a variety of well-known problems, disadvantages and limitations of conventional panel type filtration structures used in this general type of service. For example, since the shroud structure, which defines the clean air flow passage structure associated with the filter portion of the system 14, is not formed integrally with the filter structure, it need not be discarded when the filter element needs to be replaced - it can be re-used indefinitely. Further, as previously mentioned it is not in any manner necessary to enter the dirty side of the overall filtration system to remove or install the filter element or the air flow passage-defining shroud 54.

Additionally, no portion of either the filter structure 52 or the shroud 54 projects into and consumes appreciable space within the material collection chamber 30. Moreover, due to the unique utilization of the dual filter framing structure described above, the integrity of the upstream and downstream filter face seals is very efficiently and reliably maintained against the often quite high air pressure drop across the filter media. Also, in the present invention, the illustrated panel type filter is not dependent upon the clamping structure to align it with the material receiving chamber outlet opening—such alignment is advantageously achieved by the filter framing structure itself.

While the illustrated filtration system 14 has been representatively illustrated in conjunction with the hopper section 12 of a rotary broom type street sweeper 10, it will be appreciated by those skilled in this particular art that the principles of the present invention are also applicable to a wide variety of other types of particulate collection systems in which it is necessary to provide filter means at the discharge opening of a particle collection chamber of the particular system. It will also be appreciated that, while the previously described subframe support structure 50 facilitates the easy installation of the balance of the filtration system 14 on the dividing wall 34, such subframe support structure could be deleted if desired and the balance of the system 14 be installed in a suitable alternate manner directly to the dividing wall 34.

The foregoing detailed description is to be clearly understood as being given by way of illustration and example only, the spirit and scope of the present invention being limited solely by the appended claims.

What is claimed is:

1. Disposable, structurally protected filter apparatus positionable over and alignable with a fluid flow opening, formed in a generally flat wall portion and bounded by a peripheral edge portion of the wall portion, to filter fluid traversing said opening, said filter apparatus comprising:
    a panel filter media section having opposite sides and a peripheral edge portion;
    filter media bracing means extending outwardly along said opposite sides of said filter media section;
    a protective filter framing and support structure including:
        an outer support frame member having an outer side wall portion with a side edge portion, and a peripheral lip portion extending transversely inwardly from said side edge portion, and
        an inner peripheral face frame member extending around and captively retaining said peripheral edge portion of said filter media section, said inner peripheral face frame member having an outer side wall section and first and second inturned wall portions projecting from opposite side edges of said outer side wall section outwardly of and generally parallel to said peripheral edge portion of said filter media section said inner peripheral face frame member being recessed within said outer support frame member, in a direction toward said peripheral lip portion, and permanently secured within said outer support frame member; and
    alignment means, extending transversely outwardly from said peripheral lip portion of said outer support frame member and removably insertable into said fluid flow opening to engage said peripheral edge portion thereof, for aligning said filter apparatus with said fluid flow opening in a direction parallel to said generally flat wall portion, in response to insertion of said alignment means into said fluid flow opening.

2. The filter apparatus of claim 1 wherein:
said inner peripheral face frame member is fixedly secured within said outer support frame member and positioned therein in a manner such that one of said first and second inturned wall portions abuts the inner side surface of said peripheral lip portion of said outer support frame member.

3. The filter apparatus of claim 1 wherein:
said inner peripheral face frame member is fixedly secured within said outer support frame member by an adhesive bonding material interposed between facing surface portions of said outer side wall portion of said outer support frame member and said outer side wall section of said inner peripheral face frame member.

4. The filter apparatus of claim 1 wherein:
said filter media bracing means comprise a pair of perforated support panel members extending outwardly along said opposite sides of said filter media section and having peripheral edge portions captively retained in said inner peripheral face frame member.

5. The filter apparatus of claim 1 wherein:
said filter media section is of a pleated construction.

6. The filter apparatus of claim 1 wherein:
said alignment means comprise a peripheral flange extending outwardly from around an inner side edge portion of said peripheral lip portion of said outer support frame member.

7. The filter apparatus of claim 1 wherein:
said filter apparatus further comprises a peripheral flange extending transversely outwardly from around an inner side edge portion of said peripheral lip portion of said outer support frame member, and a peripheral sealing gasket member having a first portion secured to said peripheral flange and a second portion extending along the outer side surface of said peripheral lip portion of said outer support frame member, said peripheral flange and said first portion of said peripheral sealing gasket collectively defining said alignment means.

8. Disposable, structurally protected filter apparatus positionable over a fluid flow opening, formed through a generally flat wall portion, to filter fluid traversing said opening, said filter apparatus comprising:
a panel filter media section having opposite sides and a peripheral edge portion;
filter media bracing means extending outwardly along said opposite sides of said filter media section;
a protective filter framing and support structure including:
an outer support frame member having an outer side wall portion defined by first and second pairs of facing wall sections having generally coplanar first side edges positioned on one side of said outer support frame member, and second side edges positioned on the opposite side of said outer support frame member, said second side edges of said first pair of facing wall sections being offset toward said first side edges relative to said second side edges of said second pair of facing wall sections, said outer support frame member further having a peripheral lip portion extending laterally inwardly from adjacent said first side edges of said first and second pairs of facing wall sections, and an inner peripheral face frame member extending outwardly around and captively retaining said peripheral edge portion of said filter media section, said inner peripheral face frame member being permanently secured within said outer support frame member in close adjacency with said peripheral lip portion, and being recessed toward said peripheral lip portion relative to said second side edges of said second pair of facing wall sections of said outer support frame member, and alignment means, extending transversely outwardly from said peripheral lip portion of said outer support frame member and removably insertable into said fluid flow opening to engage the periphery thereof, for aligning said filter apparatus with said fluid flow opening, in a direction parallel to said generally flat wall portion, in response to insertion of said alignment means into said fluid flow opening.

9. The filter apparatus of claim 8 wherein:
said inner peripheral face frame member is secured within said outer support frame member in a manner such that said inner peripheral face frame member abuts said peripheral lip portion of said outer support frame member.

10. The filter apparatus of claim 8 wherein:
said inner peripheral face frame member is secured within said outer support frame member by an adhesive bonding material interposed between facing surface portions of said outer side wall portion of said outer support frame member and said inner peripheral face frame member.

11. The filter apparatus of claim 8 wherein:
said filter media bracing means comprise a pair of perforated support panel members extending outwardly along said opposite sides of said filter media section and having peripheral edge portions catpively retained in said inner peripheral face frame member.

12. The filter apparatus of claim 8 wherein:
said filter media section is of a pleated construction.

13. The filter apparatus of claim 8 wherein:
said outer support frame member has a rectangular configuration,
said first pair of facing wall sections are opposite front and rear end walls of said outer support frame member, and
said second pair of facing wall sections are opposite side walls of said outer support frame member.

14. The filter apparatus of claim 8 wherein:
said alignment means comprise peripheral flange means projecting transversely outwardly from said peripheral lip portion of said outer support frame member.

15. The filter apparatus of claim 14 wherein:
said peripheral flange means are secured to an inner side edge portion of said peripheral lip portion of said outer support frame member.

16. The filter apparatus of claim 14 further comprising:
a peripheral sealing gasket member having a first portion secured to said peripheral flange means, and a second portion extending along the outer side surface of said peripheral lip portion of said outer support frame member, said peripheral flange means and said first portion of said peripheral sealing gasket member collectively defining said alignment means.

17. Filtration apparatus positionable over a fluid flow opening, formed in a wall structure, to filter fluid traversing said opening, said filtration apparatus comprising:

a filter media section positionable over said fluid flow opening to intercapt and filter fluid traversing it;

filter media bracing means extending along opposite sides of said filter media section;

a protective filter framing and support structure including:

an outer support frame member having an outer side wall portion with a lower side edge portion, and a peripheral lip portion extending inwardly from said lower side edge portion, and an inner peripheral face frame member extending around and captively retaining said peripheral edge portion of said filter media section, said inner peripheral face frame member having an outer side wall section and upper and lower inturned wall portion projecting from opposite side edges of said outer side wall section outwardly of said peripheral edge portion of said filter media section, said inner peripheral face frame member being received, recessed downwardly within, and fixedly secured to said outer support frame member;

alignment means, carried by said outer support frame member and insertable into said fluid flow opening, for aligning said filter framing and support structure with said fluid flow opening;

first resilient peripheral seal means underlying and extending around said peripheral lip portion of said outer support frame member;

second resilient peripheral seal means positioned atop and extending around said upper inturned wall portion of said inner peripheral face frame member;

clean air flow shroud means, removably positionable atop said filter framing and support structure, for defining a filter backflushing flow path adapted to receive a burst of pressurized backflushing gas from a source thereof;

first cooperating means carried by said clean air flow shroud means and said filter framing and support structure and interengageable to create a predetermined operative alignment, in at least one direction generally parallel to said wall structure, between said clean air flow shroud means and said filter framing and support structure;

clamping means securable to said wall structure and operable to clamp said clean air flow shroud means downwardly against said filter framing and support structure in a manner compressing said first and second resilient peripheral seal means to form upstream and downstream seals around peripheral portions of said filter framing and support structure; and second cooperating means carried by said clean air flow shroud means and said filter framing and support structure and interengageable to limit the downward clamping movement of said clean air flow shroud means relative to said filter framing and support structure in a manner limiting to a predetermined degree the compressive clamping forces imposable upon said second resilient peripheral seal means and said inner peripheral face frame member.

18. The filtration apparatus of claim 17 wherein: said filter media section is of a pleated construction.

19. The filtration apparatus of claim 17 wherein: said filter media bracing means comprise a pair of perforated support panel members extending outwardly along said opposite sides of said filter media section and having peripheral edge portions captively retained in said inner peripheral face frame member.

20. The filtration apparatus of claim 17 wherein: said inner peripheral face frame member is anchored within said outer support frame member in a manner such that said lower inturned wall portion of said inner peripheral face frame member abuts the inner side surface of said peripheral lip portion of said outer support frame member.

21. The filtration apparatus of claim 17 wherein: said inner peripheral face frame member is anchored within said outer support frame member by an adhesive bonding material interposed between facing surface portions of said outer side wall section of said inner peripheral face frame member and said outer side wall portion of said outer support frame member.

22. The filtration apparatus of claim 17 wherein: said first cooperating means include a pair of oppositely projecting alignment flanges formed on said clean air flow shroud means, and oppositely disposed upper side sections of said outer side wall portion of said outer support frame member, said alignment flanges being positioned and configured to be closely received between said upper side sections.

23. The filtration apparatus of claim 17 wherein: said first cooperating means include a stop flange secured to and projecting downwardly from said clean air flow shroud means and engageable with an outer side surface of said outer side wall portion of said outer support frame member.

24. The filtration apparatus of claim 17 wherein: said clean air flow shroud means have a pair of corner portions adjacent a first end thereof and a central portion adjacent a second end thereof, and said clamping means are operative to engage an downwardly move said central portion and said corner portions relative to said wall structure.

25. The filtration apparatus of claim 17 wherein: said wall structure includes a main wall having an opening therein, and said filtration apparatus further comprises a subframe support structure having an opening therein and being securable to said main wall to position said subframe support structure opening over said main wall opening, said subframe support structure defining a portion of said wall structure, and said subframe support structure opening defining said fluid flow opening.

26. The filtration apparatus of claim 17 wherein: said second cooperating means include mutually spaced bottom side portions of said clean air flow shroud means, and mutually spaced upper side edge portions of said outer side wall portion of said outer support frame member.

27. The filtration apparatus of claim 17 further comprising:

backflushing means selectively operable to flow a burst of pressurized backflushing gas through said filter backflushing flow path of said clean air flow shroud means.

28. The filtration apparatus of claim 17 wherein:

said alignment means comprise peripheral flange means projecting downwardly from said filter framing and support structure.

29. The filtration apparatus of claim 28 wherein:
said peripheral flange means are secured to an inner side edge portion of said peripheral lip portion of said outer support frame member.

30. The filtration apparatus of claim 29 wherein:
said first resilient peripheral seal means comprise a peripheral sealing gasket member having a first portion secured to said peripheral flange means, and a second portion underlying and extending around the lower side surface of said peripheral lip portion of said outer support frame member, and
said peripheral flange means and said first portion of said peripheral sealing gasket member collectively define said alignment means.

31. The filtration apparatus of claim 17 wherein:
said clean air flow shroud means include a shroud member having an open end, a bottom side opening, and a plurality of internal flow passages each extending between said open end and said bottom side opening.

32. The filtration apparatus of claim 31 further comprising:
backflushing means selectively operable to flow a burst of pressurized backflushing gas through a selected one of said plurality of internal flow passages in said shroud member.

33. The filtration apparatus of claim 17 wherein:
said outer side wall portion of said outer support frame member is defined by first and second pairs of opposed wall sections having generally coplanar lower side edges, said first pair of opposed wall sections having upper side edges positioned lower than the upper side edges of said second pair of opposed wall sections,
said first cooperating means include a first peripheral base wall section of said clean air flow shroud means and upper side edge portions of said second pair of opposed wall sections, said first peripheral base wall section being positioned and configured to be closely received between said upper side edge portions of said second pair of opposed wall sections and to downwardly engage a first portion of said second resilient peripheral seal means, and
said second cooperating means include a second peripheral base wall section of said clean air flow shroud means, said second peripheral base wall section being positioned and configured to overlie the upper side edges of said first pair of opposed wall section, to downwardly engage a second portion of said second resilient peripheral seal means, and to be brought downwardly into engagement with the upper side edges of said first pair of opposed wall sections, and be stopped thereby, during operation of said clamping means.

34. The filtration apparatus of claim 33 wherein:
said outer support frame member has a rectangular configuration, and
said first and second pairs of opposed wall sections are defined by opposite side wall pairs of said outer support frame member.

35. For use with filtration apparatus positionable over a fluid outlet opening, formed in a wall structure, to intercept and filter fluid traversing said opening, clamping apparatus for releasably clamping said filtration apparatus to said wall structure, said clamping apparatus comprising:
a latch bracket having first and second mutually angled wall portions;
means for anchoring said latch bracket to said filtration apparatus;
an externally threaded rod member having an outer end portion;
means for anchoring an inner end portion of said rod member to the filter apparatus side of said wall structure to position said rod member generally transversely to said wall structure and spaced apart from said latch bracket;
an elongated latch member extending generally parallel to said wall structure and having an opening formed transversely therethrough, said opening nonthreadingly and movably receiving a longitudinally central portion of said externally threaded rod;
an internally threaded clamping bolt member having an inner end portion threaded onto said outer end portion of said externally threaded rod member;
means, including a compression spring member circumscribing said rod and positioned between said wall structure and said latch member, for frictionally associating said clamping bolt member with said latch member in a manner such that, sequentially responsive to a rotation of said bolt in a tightening direction, a first end portion of said latch member is pivoted in a first direction into engagement with said first wall portion of said latch bracket to preclude further pivoting of said latch member in said first direction, said latch member is driven inwardly along said rod to bring said first end portion of said latch member into engagement with said second wall portion of said latch bracket, and said first end portion of said latch member drives said second wall portion of said latch bracket inwardly toward said wall structure to clamp a corresponding portion of said filtration apparatus thereto and, sequentially responsive to a rotation of said bolt in a loosening direction, said latch member is moved outwardly along said rod and then pivoted in an opposite second direction to move said first end portion of said latch member out of operative association with said latch bracket; and
means for engaging and supporting the opposite end portion of said latch member as said latch member is being driven inwardly along said rod.

36. Filtration apparatus positionable essentially entirely on one side of a wall structure, over a fluid flow opening therein, for filtering a particulate-laden gas traversing said fluid flow opening, said filtration apparatus comprising:
an outer support frame having alignment flange means insertable into said fluid flow opening to position said frame around said fluid flow opening and in predetermined alignment therewith, said frame having an inturned peripheral lower side lip extending outwardly from said flange means and adapted to overlie said wall structure, said frame further having a nonlipped open upper side bordered by an upper side edge portion;
an inner face frame received and fixedly secured within said outer support frame, said inner frame frame being downwardly recessed relative to said upper side edge portion;

panel filter means, operatively held in and extending across said inner face frame, for filtering a particulate-laden gas traversing said fluid flow opening;

first peripheral seal means extending around the upper side surface of said inner face frame and being compressible to form a first fluid flow seal;

second peripheral seal means secured to, underlying and extending around the underside of said peripheral lower side lip and being compressible between said wall structure and said lip to form a second fluid flow seal;

clean air flow shroud means, removably receivable within an upper side portion of said outer support frame and movable downwardly relative thereto to compress said first and second peripheral seal means, for defining a clean air discharge flow path from said filter means;

clamping means, securable to said wall structure, for moving said clean air flow shroud means relative to said outer support frame and toward said wall structure to compress said first and second peripheral seal means; and cooperatively interengageable means on said outer support frame and said shroud means for creating a predetermined relative alignment therebetween, and for limiting the compressive clamping stress imposable upon said first peripheral seal means and said inner face frame by said clamping means.

* * * * *